(12) United States Patent
Rush

(10) Patent No.: US 7,007,447 B2
(45) Date of Patent: Mar. 7, 2006

(54) ACTUATOR DEVICE WITH A MULTI-CHAMBER HOUSING

(75) Inventor: Robert W. Rush, Put-in-Bay, OH (US)

(73) Assignee: North American Clutch Corporation, Milwaukee, WI (US)

( * ) Notice: Subject to any disclaimer, the term of this patent is extended or adjusted under 35 U.S.C. 154(b) by 0 days.

(21) Appl. No.: 10/602,333

(22) Filed: Jun. 24, 2003

(65) Prior Publication Data

US 2004/0089145 A1     May 13, 2004

Related U.S. Application Data

(60) Provisional application No. 60/424,531, filed on Nov. 7, 2002.

(51) Int. Cl.
*A01D 34/03* (2006.01)
*A01D 34/43* (2006.01)
*A01D 34/64* (2006.01)

(52) U.S. Cl. .............................. 56/14.7; 91/433; 91/29; 91/33

(58) Field of Classification Search ................. 56/10.8, 56/10.9; 180/53.4, 53.5, 305; 60/484, 488, 60/473, 475, 477, 412; 280/47.131; 417/53; 92/96; 91/433, 29, 33, 473, 169
See application file for complete search history.

(56) References Cited

U.S. PATENT DOCUMENTS

| 2,440,850 A | 5/1948 | Dilworth |
| 3,309,852 A | 3/1967 | Allen |
| 3,566,587 A | 3/1971 | Janssen |
| 3,568,420 A | 3/1971 | Hofer et al. |
| 3,757,596 A | 9/1973 | McCanse |
| 3,800,623 A | 4/1974 | Fulghum |
| 3,974,890 A * | 8/1976 | Noble ..................... 180/193 |
| 4,669,361 A * | 6/1987 | Ito et al. ..................... 91/459 |
| 4,860,862 A | 8/1989 | Yater et al. |
| 4,951,462 A * | 8/1990 | Graf ........................... 60/444 |

(Continued)

FOREIGN PATENT DOCUMENTS

| CH | 438 956 A | 6/1967 |
| DE | 27 08 177 A | 8/1978 |
| EP | 531247 A1 * | 3/1993 |
| JP | 7327458 | 12/1995 |

OTHER PUBLICATIONS

Examiner provided translation of the CH 438956 (dated Jun. 1967) & DE 2708177 (dated Aug. 1978) references cited by the applicant with the Feb. 28, 2005 IDS.*
European Search Report for EP Application No. EP 03 01 4752.

*Primary Examiner*—Árpád Fábián Kovács
(74) *Attorney, Agent, or Firm*—Michael Best & Friedrich LLP

(57) ABSTRACT

An actuator device self-contained within a housing and adapted to move an object. The actuator device includes a movable piston positioned in a cylinder portion of the housing. The cylinder portion defines a longitudinal axis, whereby the piston is movable along the longitudinal axis in response to an accumulation of air pressure within the cylinder portion. The actuator device also includes a rod coupled to the piston for movement with the piston. The rod at least partially extends outside of the housing to couple to the object. Further, the actuator device includes an air compressor located within the housing. The air compressor transfers air from a location in the housing outside the cylinder portion to a location inside the cylinder portion.

51 Claims, 8 Drawing Sheets

U.S. PATENT DOCUMENTS

| | | |
|---|---|---|
| 5,257,684 A | 11/1993 | Collins |
| 5,433,066 A | 7/1995 | Wenzel et al. |
| 5,540,558 A * | 7/1996 | Harden et al. ............... 417/53 |
| 5,570,765 A | 11/1996 | Patridge |
| 5,651,436 A | 7/1997 | Sommer |
| 5,802,850 A * | 9/1998 | Kimura ..................... 60/479 |
| 5,865,020 A | 2/1999 | Busboom et al. |
| 5,911,672 A | 6/1999 | Schaedler et al. |
| 5,918,449 A | 7/1999 | Rush et al. |
| 5,937,979 A | 8/1999 | Cummings |
| 5,939,803 A * | 8/1999 | Frost ......................... 307/126 |
| 6,230,608 B1 | 5/2001 | Schaedler et al. |
| 6,347,502 B1 | 2/2002 | de Vries |
| 6,543,560 B1 * | 4/2003 | Trefz et al. ............... 180/53.4 |
| 6,705,624 B1 * | 3/2004 | Cassoni ................ 280/47.131 |

* cited by examiner

ACTUATOR DEVICE WITH A MULTI-CHAMBER HOUSING

RELATED APPLICATIONS

The present application claims the benefit of Provisional Patent Application Ser. No. 60/424,531, filed on Nov. 7, 2002, which is hereby incorporated by reference.

FIELD OF THE INVENTION

This invention relates generally to actuator devices, and more particularly to actuator devices providing linear motion.

BACKGROUND OF THE INVENTION

Some conventional actuator devices may comprise a variation of a housing containing a movable piston with an attached rod therein. The rod usually extends outside of the housing and attaches to the object being actuated. A separate, remotely located power source is typically fluidly connected to the housing to provide a compressed fluid to the housing to move the piston and the rod. Conduit or hose is typically utilized to provide the fluid connection between the power source and the housing. Such a conventional actuator device may include a hydraulic or pneumatic cylinder, in combination with a hydraulic pump or an air pump, respectively.

Such conventional actuators may be configured, sometimes in combination with additional structure, to push or pull an object, tilt an object, open and close an object, clamp and/or grip an object, and/or raise and lower an object.

SUMMARY OF THE INVENTION

The present invention provides, in one aspect, an actuator device self-contained within a housing and adapted to move an object. The actuator device includes a movable piston positioned in a cylinder portion of the housing. The cylinder portion defines a longitudinal axis, whereby the piston is movable along the longitudinal axis in response to an accumulation of air pressure within the cylinder portion. The actuator device also includes a rod coupled to the piston for movement with the piston. The rod at least partially extends outside of the housing to couple to the object. Further, the actuator device includes an air compressor located within the housing. The air compressor transfers air from a location in the housing outside the cylinder portion to a location inside the cylinder portion.

The present invention provides, in another aspect, an actuating system including an actuator device self-contained within a housing and an object coupled to the actuator device. The actuator device includes a movable piston positioned in a cylinder portion of the housing. The cylinder portion defines a longitudinal axis, whereby the piston is movable along the longitudinal axis in response to an accumulation of air pressure within the cylinder portion. The actuator device also includes a rod coupled to the piston for movement with the piston. The rod at least partially extends outside of the housing to couple to the object. Further, the actuator device includes an air compressor located within the housing. The air compressor transfers air from a location in the housing outside the cylinder portion to a location inside the cylinder portion. The actuating system also includes the object coupled to a portion of the rod outside of the housing. The object is moved in response to movement of the piston.

The present invention provides, in yet another aspect, an actuating system including an actuator device and an object coupled to the actuator device. The actuator device includes a housing and a piston coupled to the housing by a flexible membrane. The flexible membrane divides the housing into a first chamber and a second chamber fluidly separated from the first chamber. The piston is responsive to an accumulation of air pressure within the housing. The actuator device also includes a rod coupled to the piston for movement with the piston. The rod at least partially extends outside of the housing. Further, the actuator device includes an air compressor fluidly connected with the first chamber of the housing. The air compressor is operable to generate the air pressure within the first chamber of the housing. The actuator device also includes a valve selectively fluidly connecting the first chamber and a location outside of the housing to vent the air pressure from the first chamber. The actuating system also includes the object coupled to a portion of the rod outside of the housing. The object is moved in response to movement of the piston.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts.

Figure 1:
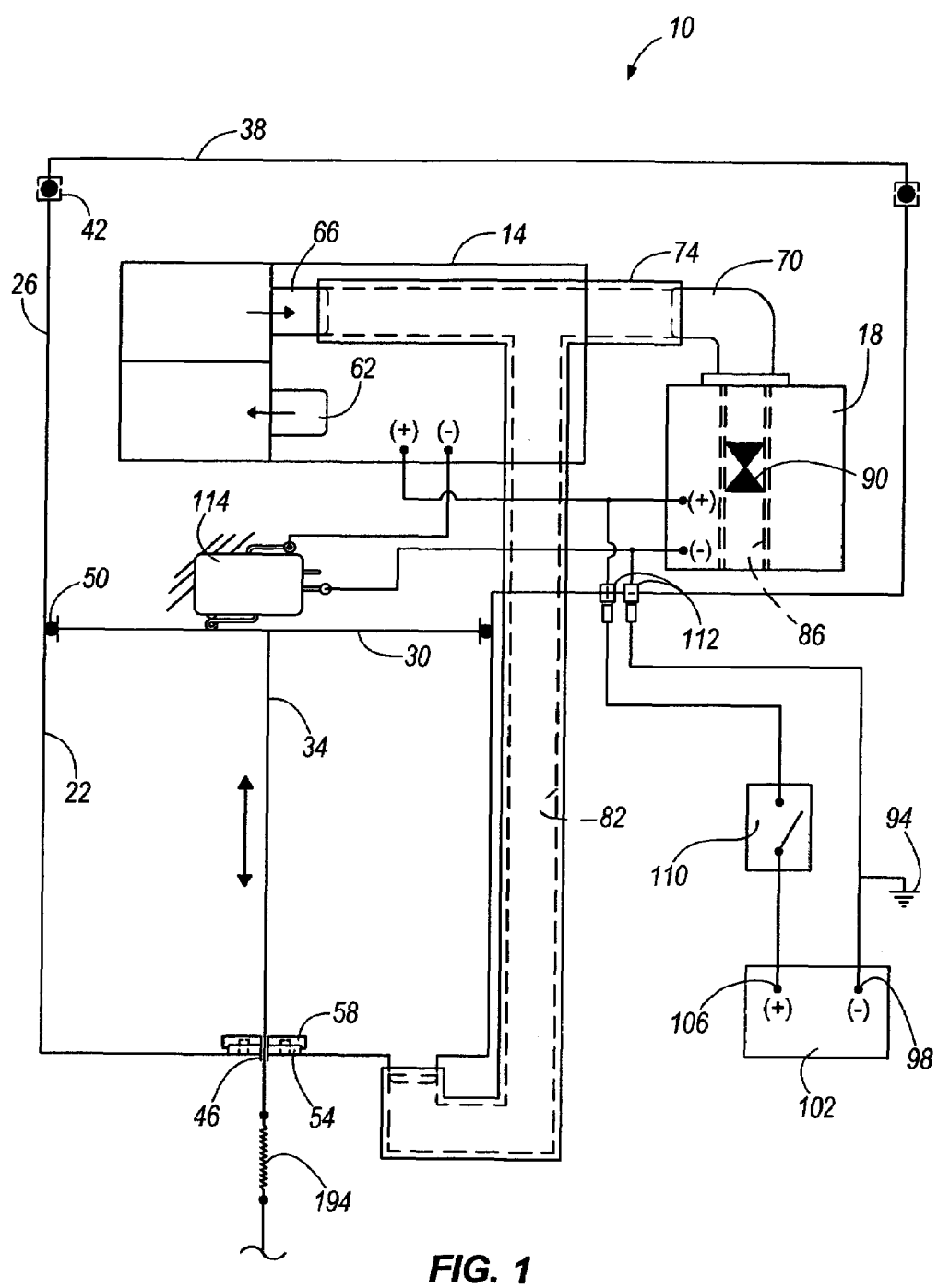
FIG. 1 is a schematic illustration of one construction of an actuator device.

Before any features of the invention are explained in detail, it is to be understood that the invention is not limited in its application to the details of construction and the arrangements of components set forth in the following description or illustrated in the drawings. The invention is capable of other constructions and of being practiced or of being carried out in various ways. Also, it is to be understood that the phraseology and terminology used herein is for the purpose of description and should not be regarded as limited.

DETAILED DESCRIPTION

As shown schematically in FIG. 1, one construction of an actuator device 10 including an air compressor 14 and a solenoid valve 18 selectively provides pressurized air to a cylinder portion 22 of a housing 26 containing a movable piston 30 having a rod 34 attached thereto. In the illustrated construction of the actuator device 10, the air compressor 14 provides compressed air to the cylinder portion 22, however, the compressor 14 may be configured to provide any of a number of compressed fluids or gasses to the cylinder portion 22. The compressor 14 is operable to provide, for example, a volumetric flow of 3 liters per minute of pressurized air at 10 psi pressure.

As shown schematically in FIG. 1, the compressor 14 and solenoid valve 18, among other components, are enclosed within the housing 26. The housing 26 is sealed such that a substantially fixed volume of air (or other gas) is present and maintained therein. However, in other constructions of the actuator device 10, the housing 26 may not be sealed such that air may flow between inside and outside of the housing 26. The housing 26 is sealed by a cover 38. A tongue (not shown) is formed on the cover to engage a corresponding groove 42 (see FIG. 2a) formed in the housing to help prevent debris or other contaminant matter from entering the housing 26 and affecting the performance of the actuator device 10. The housing 26 is made of a petroleum-resistant and dimensionally stable plastic, such as 10% glass filled polypropylene, during a molding process. The housing 26 is formed with a draft to assist in ejecting the housing 26 from its mold after it is formed. Alternatively, other plastics having these characteristics may be used, and different types and amounts of fillers other than glass fiber may be used. Also, the housing 26 may be made of metal by such methods including, among others, die casting.

Figure 2:
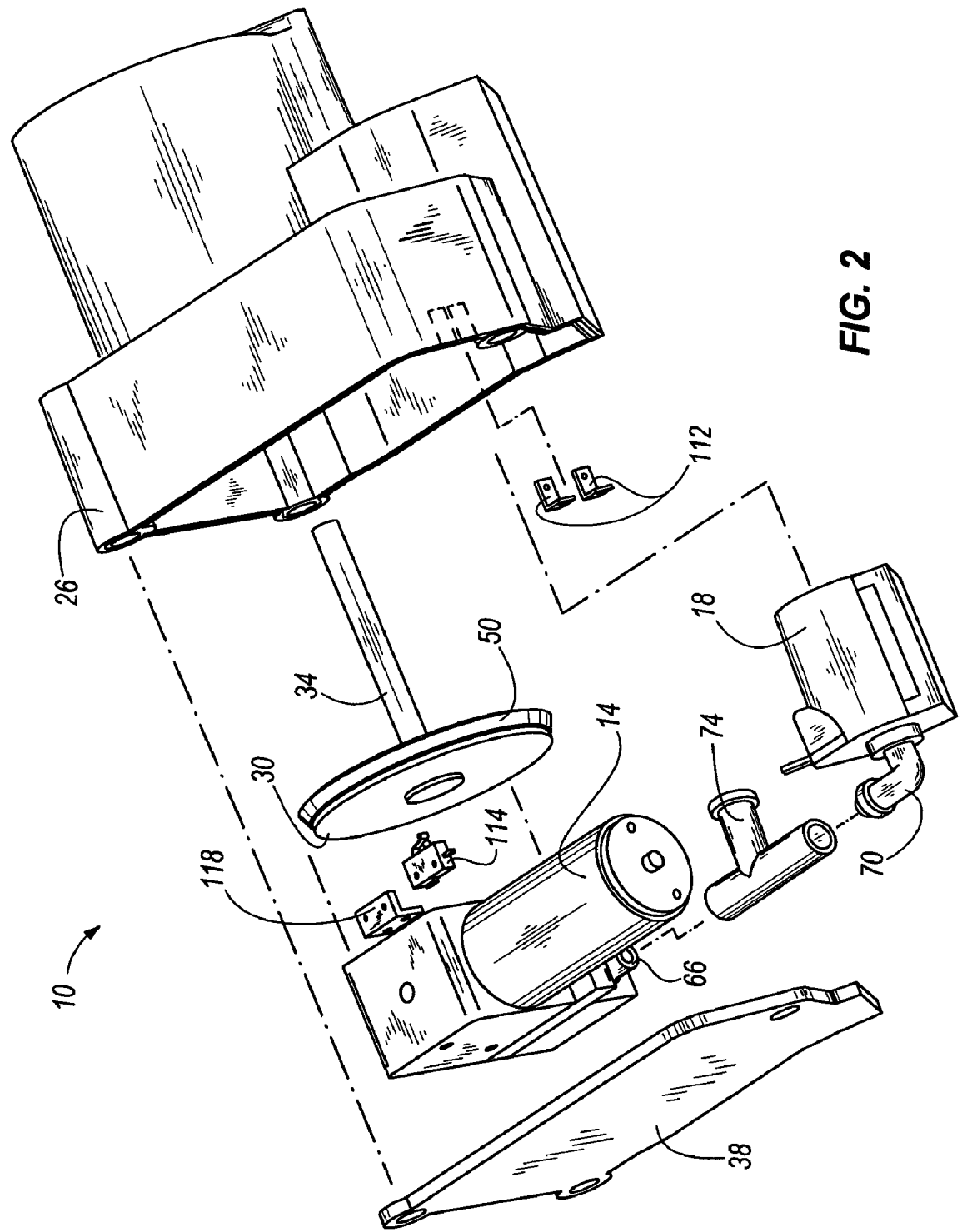
FIG. 2 is an exploded perspective view of the components of the actuator device of FIG. 1.
Figure 2A:
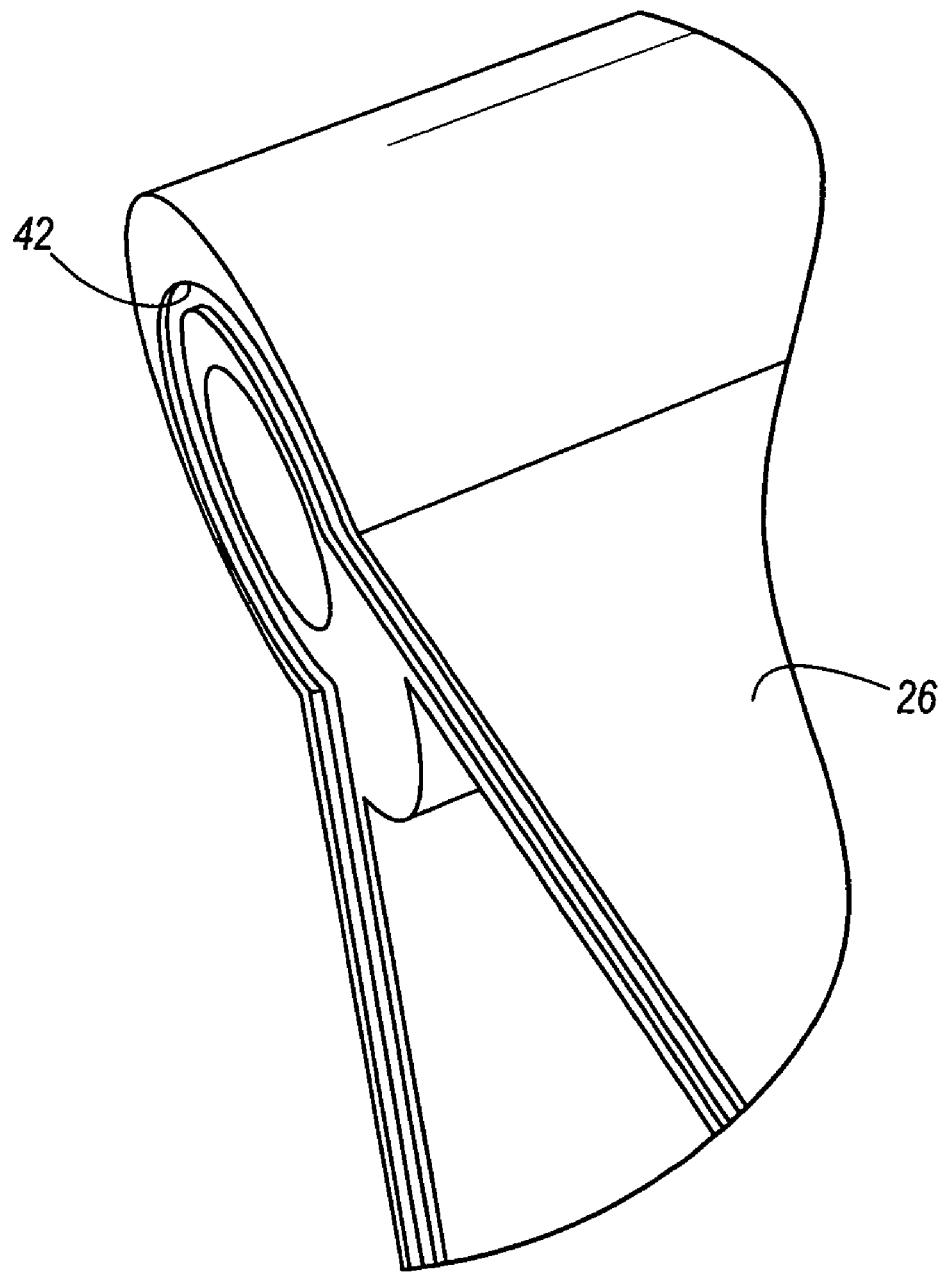
FIG. 2a is an enlarged view of a housing component of FIG. 2.
Figure 3:
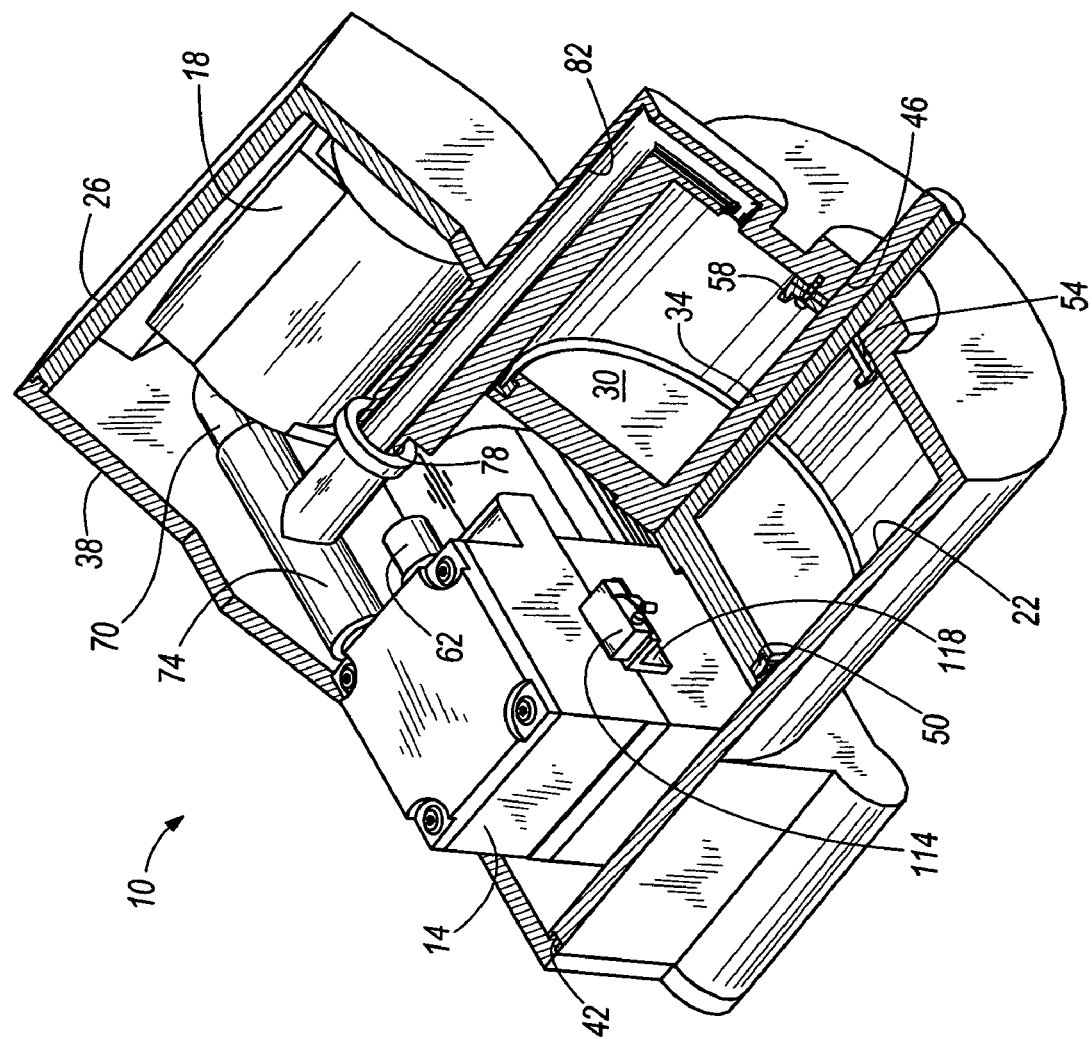
FIG. 3 is an assembled cutaway view of the actuator device of FIG. 2.

The piston 30 is axially movable within the cylinder portion 22 of the housing 26. The rod 34 is coupled to the piston 30 and protrudes through an opening 46 in the housing 26. The rod 34 may be coupled to the piston 30 in any of a number of ways, including fastening, bonding, and integrally forming. As schematically illustrated in FIG. 1, and as shown in FIGS. 2 and 3, a lip seal 50 encircles the piston 30 to substantially prevent pressurized air accumulated in the cylinder portion 22 from leaking to other portions of the housing 26. The lip seal 50 readily adjusts itself to the changing diameter of the cylinder portion 22, since the housing 26 is formed with a draft. In addition, when pressurized air is accumulated in the cylinder portion 22, the pressurized air helps maintain the lip seal 50 against the cylinder portion 22 to substantially prevent the pressurized air from leaking to other portions of the housing 26. However, in other constructions of the actuator device 10 where the cylinder portion 22 does not include a draft, an O-ring seal may be used in place of the lip seal 50. Further, in yet other constructions of the actuator device 10, the piston 30 may be made to provide minimal clearance between the walls of the housing 26 defining the cylinder portion 22 and the piston 30, such that the seal 50 may not be necessary.

As shown schematically in FIG. 1, and also in FIG. 3, another seal 54 encircles the rod 34 to substantially prevent pressurized air accumulated in the cylinder portion 22 from leaking outside the cylinder portion 22 via the opening 46. The seal 54 is maintained in place by a backup ring 58 fastened to the housing 26. Like the seal 50 encircling the piston 30, the seal 54 encircling the rod 34 may also be configured as a lip seal, among other types of seals.

The piston 30 and/or rod 34 are made of the same plastic as the housing 26 to ensure stable dimensional relationships between the components during varying temperature. The piston 30 and rod 34 may be molded as one piece, rather than molding separate pieces that require joining. Making the piston 30, rod 34, and housing 26 from the same plastic material helps ensure the components expand and contract at about the same rate and approximate amount. Alternatively, the piston 30 and/or rod 34 may be made of metal by such methods including, among others, die casting.

The compressor 14 includes an inlet port 62 and an outlet port 66, whereby the air (or other gas) in the housing 26 outside the cylinder portion 22 is drawn through the inlet port 62, compressed to an elevated pressure, and discharged through the outlet port 66. The compressor outlet port 66 is fluidly connected to an inlet port 70 of the solenoid valve 18 via a conduit 74. The conduit 74 may include rubber tubing, plastic tubing, or any equivalent thereof.

The conduit 74 also fluidly connects the outlet port 66 of the compressor 14 with a location inside the cylinder portion 22 via a cylinder port 78 and a passageway 82. As shown in FIG. 3, the cylinder port 78 and the passageway 82 are integrally formed with the housing 26. However, in other constructions of the actuator device (not shown), the passageway may be provided by a conduit separate and apart from the housing 26. Also, in other constructions of the actuator device (not shown), portions of the conduit or the entire conduit may be integrally formed with the housing 26.

In the illustrated construction of the actuator device 10, the solenoid valve 18 is configured as a conventional two port, two position solenoid valve 18. The solenoid valve 18 is biased toward an open position, in which the inlet port 70 is fluidly connected with an outlet port 86 of the solenoid valve 18 by an internal valve 90 within the solenoid valve 18. Upon being energized, the solenoid valve 18 moves toward a closed position, in which the inlet port 70 is fluidly disconnected from the outlet port 86.

As shown schematically in FIG. 1, the actuator device 10 is wired with a carrier vehicle (not shown), such as a lawnmower or a lawn tractor. The solenoid valve 18 and compressor 14 are electrically grounded to the vehicle chassis 94, along with a negative terminal 98 of a battery 102. Alternatively, the solenoid valve 18 and compressor 14 may be electrically grounded directly to the battery 102. A positive terminal 106 of the battery 102 is electrically connected to the solenoid valve 18 through a normally-open switch 110. The switch 110 can be any of a variety of user-manipulated switches including push-buttons, toggle switches, knobs, levers, and so forth. As shown schematically in FIG. 1, and also in FIG. 2, multiple conductive terminals 112 are insertable in the housing 26 to electrically connect respective positive and negative wire leads inside the housing 26 with respective positive and negative wire leads outside of the housing 26.

The positive terminal 106 of the battery 102 is electrically connected to the compressor 14 through the normally-open switch 110 and a normally-closed limit switch 114. As shown schematically in FIG. 1, the limit switch 114 is spliced downstream of the switch 110 such that when the switch 110 is closed, voltage is provided to the normally-closed limit switch 114. Subsequently, if the limit switch 114 is closed, voltage is provided to the compressor 14. The limit switch 114 is fixedly mounted to the compressor 14 via a bracket 118 (see FIG. 2) such that the limit switch 114 is placed in close proximity to the piston 30, such that selective movement of the piston 30 contacts and triggers the limit switch 114 to open the electrical circuit between the battery 102 and the compressor 14. Alternatively, a normally-closed pressure switch (not shown) may be used rather than the limit switch 114. The normally-closed pressure switch may be configured to open the circuit between the battery 102 and the compressor 14 when a pre-determined pressure is reached within the cylinder portion 22. As a further alternative, any combination of electrical components and wiring that yields the same result may be used. Also, any number of safety switches (e.g., a seat switch and a transaxle switch), relays, and/or other electrical components (not shown) may be included in the electrical circuit schematically illustrated in FIG. 1.

To activate the actuator device 10 from a deactivated state, in which the piston 30 and rod 34 are fully extended from the housing 26, the switch 110 is first closed to energize the solenoid valve 18 and the compressor 14. Upon energizing the solenoid valve 18, the inlet port 70 is fluidly disconnected from the outlet port 86. The compressor 14 then pumps air through the conduit 74 and into the cylinder portion 22 via the passageway 82. Since the solenoid valve 18 is energized, the solenoid valve 18 is maintained in a closed position, thereby providing a "plug" to the pressurized air in the conduit 74 and the cylinder portion 22. As the cylinder portion 22 fills with air, the air pressure forces the piston 30 to axially move inside the cylinder portion 22. As a result, the rod 34 retracts into the housing 26. Upon reaching a pre-determined stroke, the piston 30 contacts and triggers the limit switch 114 such that the electrical circuit between the battery 102 and compressor 14 is opened, therefore de-energizing the compressor 14.

The pressure is maintained within the conduit 74 and cylinder portion 22 to maintain the rod 34 in a retracted position. If air leaks from the system (i.e. from the compressor 14, the solenoid valve 18, the conduit 74, or the cylinder portion 22), equalization of pressures within the housing 26 causes the piston 30 to move away from the limit switch 114, therefore closing the electrical circuit between the battery 102 and compressor 14, and re-energizing the compressor 14. The compressor 14 pumps air through the conduit 74, through the passageway 82, and into the cylinder portion 22 until the amount of leaked air is replaced and the rod 34 resumes its retracted position at its pre-determined stroke, once again de-energizing the compressor 14.

To de-activate the actuator device 10 from an activated state, in which the piston 30 and rod 34 are fully retracted into the housing 26, the switch 110 is opened, therefore de-energizing the compressor 14 and solenoid valve 18. As a result, the pressurized air in the cylinder portion 22, passageway 82, and the conduit 74 is vented to the interior of the housing 26 through the outlet port 86 of the solenoid valve 18. Finally, the equalization of pressures within the housing 26 causes the piston 30 to move away from the limit switch 114.

Figure 4:
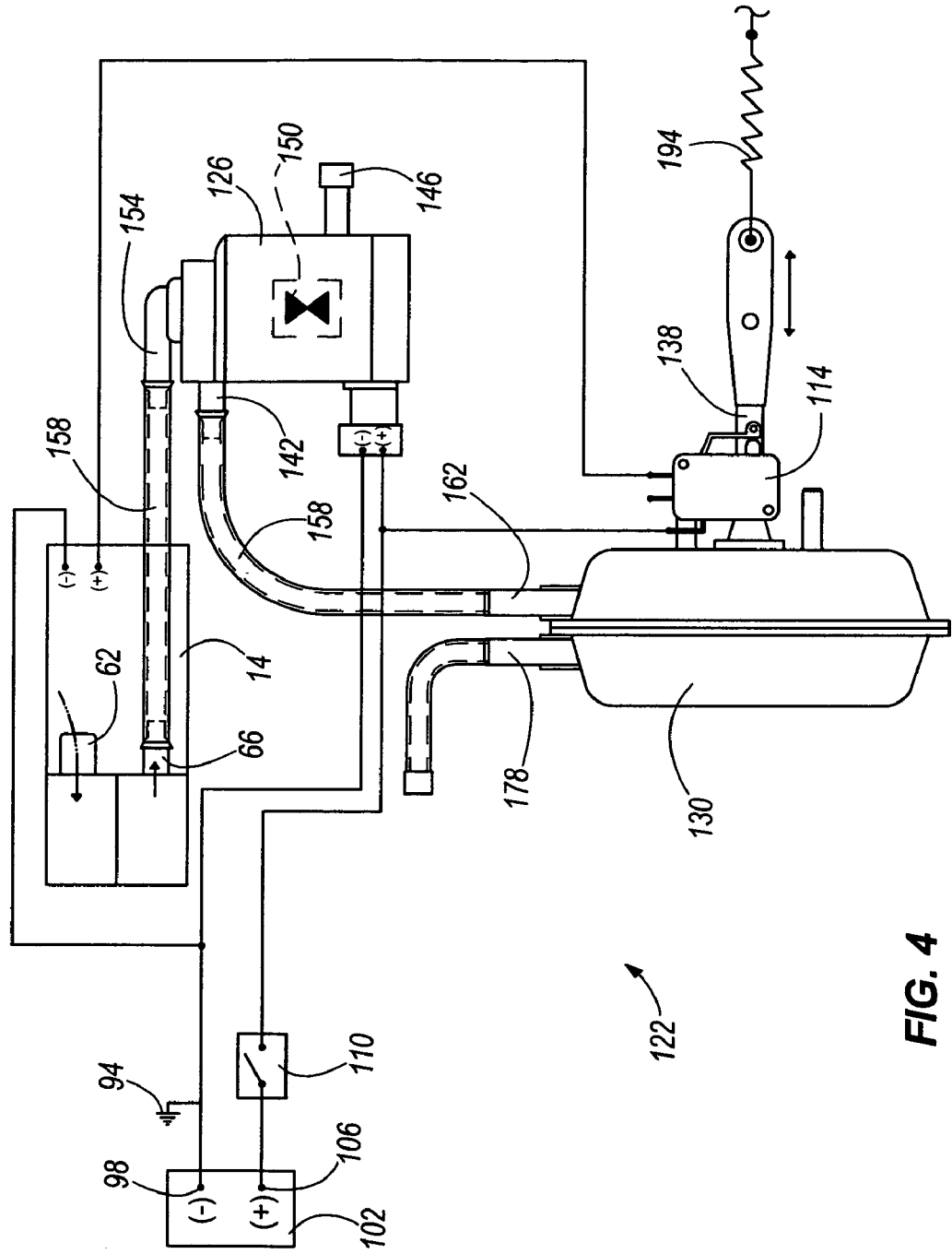
FIG. 4 is a schematic illustration of another construction of an actuator device.
Figure 5:
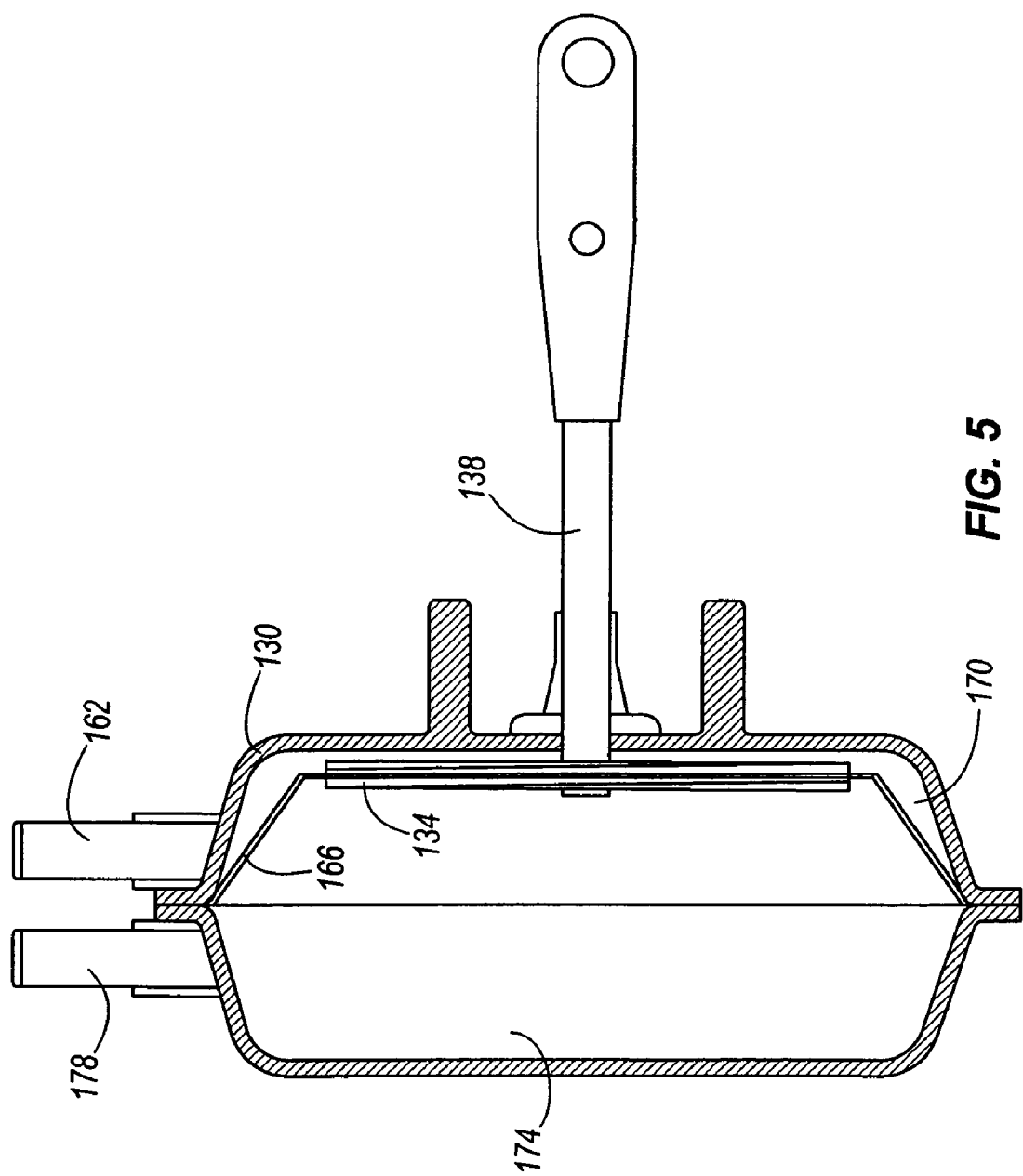
FIG. 5 is a partial cross-sectional view of a portion of the actuator device of FIG. 4.

As shown schematically in FIGS. 4 and 5, another construction of an actuator device 122 includes the air compressor 14 and a solenoid valve 126 selectively providing pressurized air to an expansible chamber, or housing 130, having a movable piston 134 therein with a rod 138 attached thereto. The compressor 14 is substantially the same as the compressor 14 of the actuator device 10 of FIGS. 1–3, and will not be further discussed.

In the illustrated construction of the actuator device 122, the solenoid valve 126 is configured as a conventional three port, two position solenoid valve 126. The solenoid valve 126 is biased toward a venting position, in which an outlet port 142 of the solenoid valve 126 is fluidly connected with a venting port 146 of the solenoid valve 126 by an internal valve 150 within the solenoid valve 126. Upon being energized, the solenoid valve 126 moves toward a non-venting position, in which an inlet port 154 is fluidly connected with the outlet port 142 of the solenoid valve 126.

The outlet port 66 of the compressor 14 is fluidly connected to the inlet port 154 of the solenoid valve 126 by a conduit 158. The conduit 158 may include rubber tubing, plastic tubing, or any equivalent thereof. The outlet port 142 of the solenoid valve 126 is also fluidly connected to an inlet port 162 of the housing 130 by additional conduit 158. As shown in FIG. 5, the housing 130 includes a flexible membrane 166 having the piston 134 and rod 138 attached thereto. The flexible membrane 166 also fluidly separates the housing 130 into two portions, a pressurized portion 170 and a venting portion 174. The housing 130 further includes a venting port 178 to allow air to either escape or enter the venting portion 174, depending on the direction of movement of the piston 134.

As shown schematically in FIG. 4, the solenoid valve 126 and compressor 14 are electrically grounded to the chassis 94 of the carrier vehicle (not shown), such as a lawnmower or a lawn tractor, along with the negative terminal 98 of the battery 102. Alternatively, the solenoid valve 126 and compressor 14 may be electrically grounded directly to the battery 102. The positive terminal 106 of the battery 102 is electrically connected to the solenoid valve 126 through the normally-open switch 110. As previously stated, the switch 110 can be any of a variety of user-manipulated switches including pushbuttons, toggle switches, knobs, levers, and so forth.

The positive terminal 106 of the battery 102 is electrically connected to the compressor 14 through the normally-open switch 110 and the normally-closed limit switch 114. As shown schematically in FIG. 4, the limit switch 114 is spliced downstream of the switch 110 such that when the switch 110 is closed, voltage is provided to the normally-closed limit switch 114. Subsequently, if the limit switch 114 is closed, voltage is provided to the compressor 14. The limit switch 114 is fixedly mounted to the housing 130 such that the limit switch 114 is in close proximity to the rod 138 and that selective movement of the rod 138 triggers the limit switch 114 and opens the circuit between the battery 102 and the compressor 14. Alternatively, a normally-closed pressure switch (not shown) may be used rather than the limit switch 114. The normally-closed pressure switch may be configured to open the circuit between the battery 102 and the compressor 14 when a pre-determined pressure is reached within the pressurized portion 170 (see FIG. 5). As a further alternative, any combination of electrical components and wiring that yields the same result may be used. Also, any number of safety switches (e.g., a seat switch and a transaxle switch), relays, and/or other electrical components (not shown) may be included in the electrical circuit schematically illustrated in FIG. 1.

To activate the actuator device 122 from a deactivated state, in which the piston 134 and rod 138 are fully extended from the housing 130, the switch 110 is first closed to energize the solenoid valve 126 and the compressor 14. Upon energizing the solenoid valve 126, the inlet port 154 is fluidly connected with the outlet port 142. The compressor 14 then pumps air through the solenoid valve 126 and into the pressurized portion 170 of the housing 130. As the pressurized portion 170 of the housing 130 fills with air, the piston 134 moves in accordance with the flexible membrane 166. Further, the rod 138 is forced to retract within the housing 130. Upon fully retracting, the rod 138 contacts and triggers the limit switch 114 such that the electrical circuit between the battery 102 and compressor 14 is opened, therefore de-energizing the compressor 14.

The pressure is maintained within the conduit 74 and the pressurized portion 170 of the housing 130 to maintain the rod 138 in the fully retracted position. If air leaks from the system (i.e. from the compressor 14, the solenoid valve 126, the conduit 158, or the housing 130), equalization of pressures within the housing 130 causes the rod 138 to move away from the limit switch 114, therefore closing the electrical circuit between the battery 102 and compressor 14 and re-energizing the compressor 14. The compressor 14 pumps air through the solenoid valve 126 and into the pressurized portion 170 of the housing 130 until the amount of leaked air is replaced and the rod 138 resumes its fully retracted position, once again de-energizing the compressor 14.

To de-activate the actuator device 122, the switch 110 is opened, therefore de-energizing the compressor 14 and solenoid valve 126. Upon de-energizing the solenoid valve 126, the outlet port 142 is fluidly connected with the venting port 146. As a result, the pressurized air in the pressurized portion 170 of the housing 130 and conduit 158 is vented to the atmosphere through the venting port 146 of the solenoid valve 126. Finally, the equalization of pressures within the housing 130 causes the piston 134 to move in accordance with the flexible membrane 166, and the rod 138 to move away from the limit switch 114.

Although not shown in FIG. 4, the compressor 14, the solenoid valve 126, and the conduit 158 may be packaged inside the housing 130, rather than being positioned remotely from the housing 130.

Figure 6:
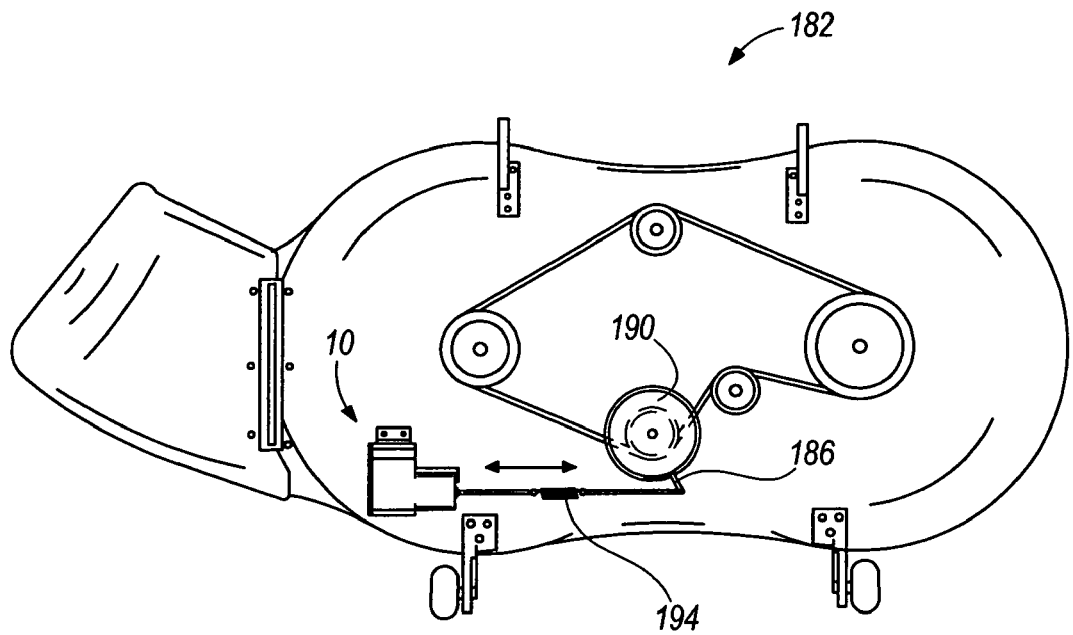
FIG. 6 is a top view of a mower deck, illustrating the actuator device of FIG. 2 coupled to a clutch/brake assembly selectively driving a mower blades in the mower deck.

FIG. 6 illustrates an actuating system 182 including the actuator device 10 providing movement to an object in the form of a lever 186 of a clutch/brake assembly 190 typically found in lawn and garden equipment, such as lawnmowers and lawn tractors, and as shown and described in U.S. Pat. No. 5,570,765. As shown in FIG. 6, the clutch/brake assembly 190 is utilized to engage and disengage multiple mower blades (not shown) driven by a system of belted pulleys. Although only one specific configuration of the actuator device 10 in combination with the clutch/brake assembly 190 is shown, it should be known that the configuration of the actuator device 10 with the clutch/brake assembly 190 is not limited to what is shown in FIG. 6. Also, although the actuator device 10 of FIGS. 1–3 is shown providing movement to various objects in FIGS. 6–7, it should be known that the actuator device 122 of FIG. 4 may also be used.

The rod 34 of the actuator device 10 is coupled to the lever 186 via a resilient member. In the illustrated construction of the actuating system 182, the resilient member is in the form of a spring 194. The spring 194 is coupled between the rod 34 and the lever 186 to provide a window of adjustment of the force applied to the lever 186. Any of a number of conventional methods of coupling the rod to the spring and the spring to the lever may be used. Upon activation of the device 10, the rod 34 is retracted into the housing 26, causing the spring 194 to stretch and the lever 186 to pivot. The spring 194 can be sized (both length and stiffness), according to the amount of retraction of the rod 34, to provide a desired force on the lever 186. In the illustrated actuating system 182, once a linear force of about 50 pounds is achieved in the spring 194, the lever 186 is caused to pivot and engage the clutch/brake assembly 190. After the lever 186 pivots, the spring 194 will continue to stretch until the rod 34 is retracted the amount governed by the stroke of the piston 30. The device 10 may be configured to provide a somewhat slow, and steady engagement of the clutch/brake assembly 190 to prevent jarring impact forces as a result of rapidly engaging the clutch/brake assembly 190. Also, the device 10 may be configured to disengage the clutch/brake assembly 190 very quickly.

Figure 7:
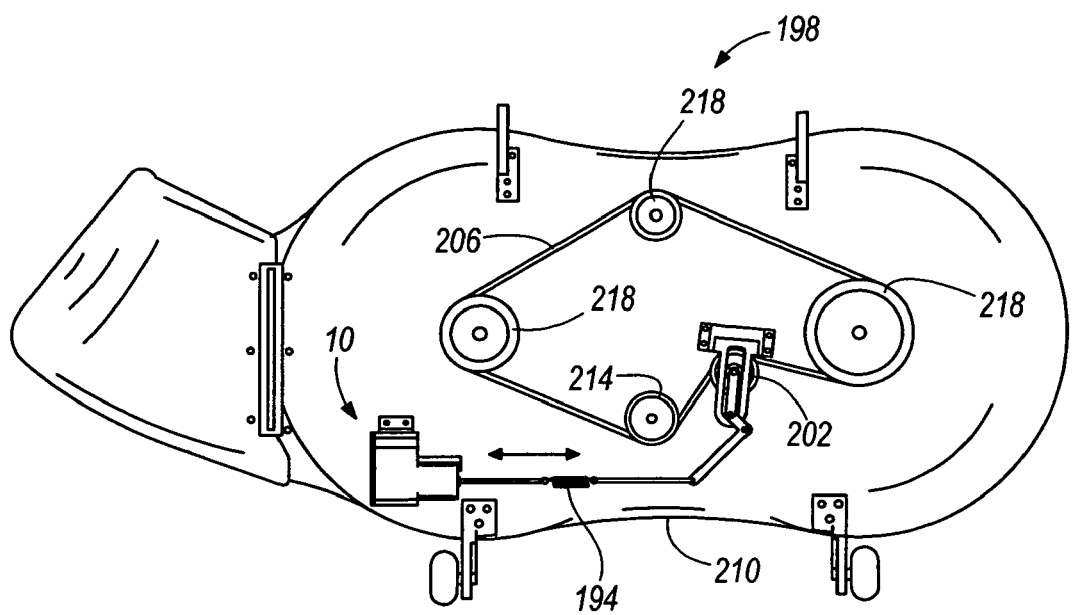
FIG. 7 is a top view of a mower deck, illustrating the actuator device of FIG. 2 coupled to an idler pulley selectively tensioning a belt of a pulley system to selectively drive mower blades in the mower deck.

As shown in FIG. 7, another actuating system 198 may include the device 10 actuating an idler pulley 202 to engage a belt 206 of a pulley system on a mower deck 210 carried by a riding lawnmower (not shown). When activated, the device 10 is operable to engage the idler pulley 202 such that the idler pulley 202 tensions the belt 206 so that torque may be transferred from a driving pulley 214 to driven pulleys 218 in the system, thereby engaging mower blades in the mower deck 210. When deactivated, the device 10 is operable to disengage the idler pulley 202 from the belt 206, such that the idler pulley 202 loosens the belt 206 so the belt 206 slips on the pulleys 214, 218 and does not transfer torque from the driving pulley 214 to the driven pulleys 218, thereby disengaging the mower blades in the mower deck 210. Like the system 182 of FIG. 6, the spring 194 may be utilized in the system 198 of FIG. 7 to adjust the force applied to the idler pulley 202 by the device 10. Further, the device 10 may be configured in the system 198 of FIG. 7 to provide a slow engagement of the idler pulley and a rapid disengagement, like the device in the system 182 of FIG. 6.

Figure 8:
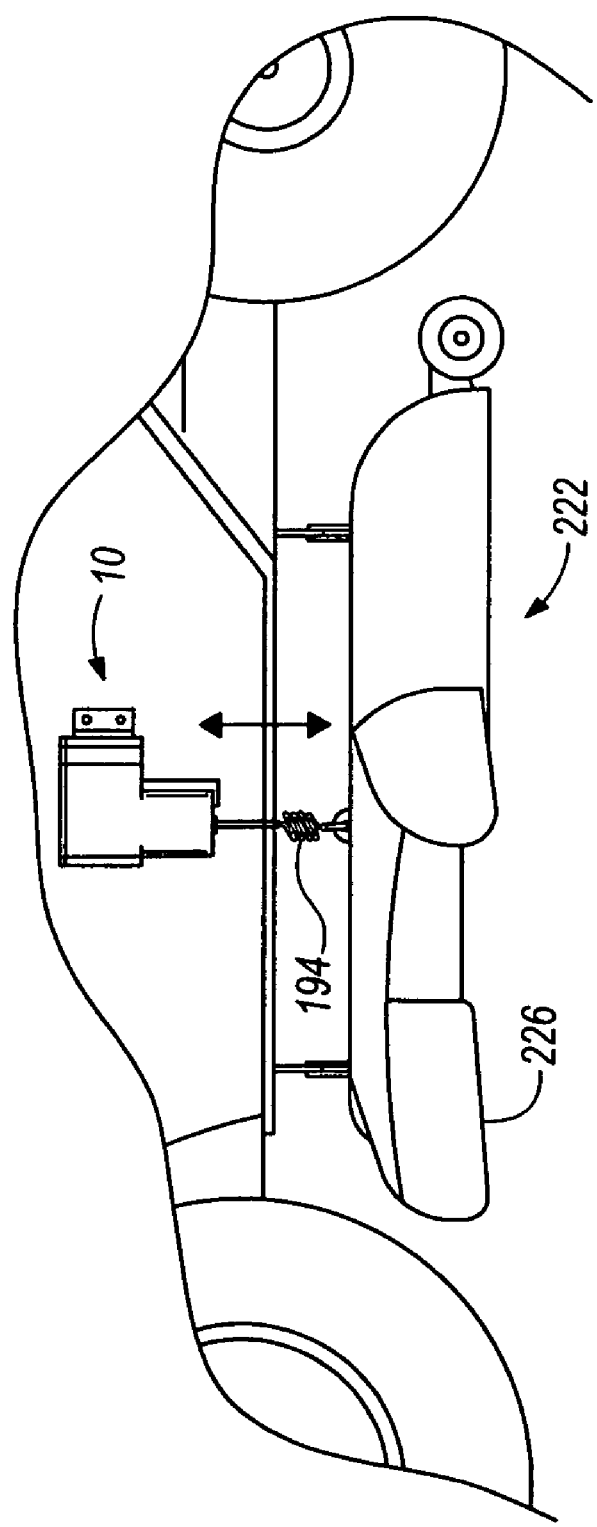
FIG. 8 is a side view of a mower deck coupled to a riding lawnmower, illustrating the actuator device of FIG. 1 coupled to the mower deck to raise and lower the mower deck relative to the riding lawnmower.

As shown in FIG. 8, yet another actuating system 222 may include the device 10 raising and lowering a mower deck 226 carried by a riding lawnmower. When activated, the device 10 is operable to raise the mower deck 226 such that mower blades (not shown) in the mower deck 226 are displaced upwardly relative to the riding lawnmower. When deactivated, the device 10 is operable to lower the mower deck 226 such that the mower blades are displaced downwardly relative to the riding lawnmower. Like the systems 182, 198 of FIGS. 6 and 7, the spring 194 may be utilized in the system 222 of FIG. 8 to adjust the force applied to the mower deck 226 by the device 10. Further, the device 10 may be configured in the system 222 of FIG. 8 to raise or lower the mower deck 226 slowly, or raise or lower the mower deck 226 quickly.

I claim:

1. A self-contained actuator device adapted to move an object, the actuator device comprising:
    a housing containing a substantially fixed mass of air sufficient to operate the actuator device, the housing substantially sealed such that the substantially fixed mass of air is maintained therein;
    a movable piston positioned in the housing and separating the housing into a first chamber and a second chamber, the piston being movable along a longitudinal axis in response to changes in air pressure in the first and second chambers;
    a rod coupled to the piston for movement with the piston, the rod extending through the first chamber and at least partially extending outside of the housing to couple to the object; and
    an air transfer device positioned in the second chamber of the housing, the air transfer device selectively energized based upon air pressure in the first chamber to transfer air from the second chamber of the housing to the first chamber of the housing, thereby moving the piston and the rod in a retracting directions,
    wherein to move the piston and the rod in an extending direction, air is vented from the first chamber to the second chamber.

2. The actuator device of claim 1, and further comprising a passageway fluidly connecting the air transfer device and the first chamber, wherein the passageway is located in the housing.

3. The actuator device of claim 2 wherein the air transfer device includes an air inlet for receiving air from the second chamber and an air outlet fluidly connected with the passageway.

4. The actuator device of claim 1, and further comprising a valve positioned in the housing, the valve selectively fluidly connecting the first chamber of the housing and the second chamber of the housing.

5. The actuator device of claim 4 wherein the valve selectively fluidly connects the first chamber and the second chamber to vent air pressure from the first chamber to the second chamber.

6. The actuator device of claim 4, and further comprising a passageway fluidly connecting the air transfer device and the first chamber, wherein the valve selectively fluidly connects the first chamber via the passageway to the second chamber, and further wherein the passageway is located in the housing.

7. The actuator device of claim 4 wherein the valve comprises a solenoid valve selectively actuated by an electrical power source.

8. The actuator device of claim 7, and further comprising a switch selectively electrically connecting the solenoid valve and the power source.

9. The actuator device of claim 1, and further comprising:
   a normally-open main power switch electrically connected with a power source; and
   a normally-closed limit switch positioned within the housing adjacent the piston such that selective movement of the piston triggers the limit switch, the limit switch selectively electrically connecting the air transfer device and the main power switch, wherein the main power switch selectively electrically connects the air transfer device and the power source to energize the air transfer device.

10. The actuator device of claim 9 wherein when the main power switch is closed, voltage from the power source is applied to the limit switch to energize the air transfer device.

11. The actuator device of claim 10 wherein when the piston triggers the limit switch, the limit switch is opened to de-energize the air transfer device, and further wherein the air pressure within the first chamber is maintained substantially constant.

12. The actuator device of claim 11 wherein when air leaks from the first chamber, the piston moves away from the limit switch and the limit switch closes to energize the air transfer device, and further wherein the air transfer device transfers air from the second chamber to the first chamber until the piston triggers the limit switch to open and to de-energize the air transfer device.

13. The actuator device of claim 10 wherein when the main power switch is open, the air transfer device is de-energized and air pressure is equalized between the first chamber of the housing and the second chamber of the housing.

14. The actuator device of claim 1, and further comprising:
   a main power switch electrically connected with a power source; and
   a limit switch positioned adjacent the rod such that selective movement of the rod triggers the limit switch, the limit switch selectively electrically connecting the air transfer device and the main power switch, wherein the main power switch selectively electrically connects the air transfer device and the power source to energize the air transfer device.

15. The actuator device of claim 1 wherein the air transfer device comprises an air compressor.

16. The actuator device of claim 1 wherein the air transfer device comprises an air pump.

17. An actuator system comprising:
   a self-contained actuator device including
      a housing containing a substantially fixed mass of air sufficient to operate the actuator device, the housing substantially sealed such that the substantially fixed mass of air is maintained therein;
      a movable piston positioned in the housing to separate the housing into a first chamber and a second chamber, the piston being movable along a longitudinal axis in response to changes in air pressure in the first and second chambers;
      a rod coupled to the piston for movement with the piston, the rod at least partially extending outside of the housing, and
      an air transfer device located within the second chamber of the housing, the air transfer device selectively energized based upon air pressure in the first chamber to transfer air from the second chamber of the housing to the first chamber of the housing wherein a pre-determined air pressure is maintained in the first chamber by the air transfer device,
      wherein as air pressure increases in the first chamber the rod retracts into the housing, and
      further wherein as air pressure is vented from the first chamber to the second chamber, air pressure decreases in the first chamber and the rod extends out of the housing;
   an object coupled to a portion of the rod outside the housing, the object being moved in response to movement of the piston; and
   a main power switch electrically connected between the air transfer device and a power source.

18. The actuating system of claim 17, and further comprising a passageway fluidly connecting the air transfer device and the first chamber, the passageway located in the housing.

19. The actuating system of claim 17, and further comprising a valve selectively fluidly connecting the first chamber of the housing to the second chamber of the housing.

20. The actuating system of claim 19 wherein the valve vents air pressure from the first chamber to the second chamber.

21. The actuating system of claim 19 wherein the valve comprises a solenoid valve selectively actuated by the power source.

22. The actuating system of claim 21, and further comprising a switch selectively electrically connecting the valve and the power source.

23. The actuating system of claim 17, and further comprising a normally-closed limit switch positioned within the housing adjacent the piston such that selective movement of the piston triggers the limit switch open or closed, the limit switch selectively electrically connecting the air transfer device and the main power switch.

24. The actuating system of claim 17, and further comprising a normally-closed limit switch positioned adjacent the rod such that selective movement of the rod triggers the limit switch open or closed, the limit switch selectively electrically connecting the air transfer device and the main power switch.

25. The actuating system of claim 17 wherein the object includes a lever for a clutch/brake assembly, wherein actuation of the lever causes engagement and disengagement of the clutch/brake assembly, and wherein the rod is coupled to the lever to engage and disengage the clutch/brake assembly in response to movement of the rod.

26. The actuating system of claim 25, and further comprising a spring coupled between the rod and the lever.

27. The actuating system of claim 17 wherein the object includes an idler pulley of a pulley system, wherein the idler pulley is selectively actuated to engage and disengage a belt in the pulley system, and wherein the rod is coupled to the idler pulley to engage and disengage the belt in response to movement of the rod.

28. The actuating system of claim 17 wherein the object includes a powered implement carried by a motorized vehicle.

29. The actuating system of claim 28 wherein the implement includes a mower deck carried by a riding lawnmower, and wherein the actuator device is configured to raise and lower the mower deck relative to a mowing surface traveled by the riding lawnmower.

30. The actuating system of claim 17 wherein the air transfer device comprises an air compressor.

31. The actuating system of claim 17 wherein the air transfer device comprises an air pump.

32. A self-contained actuator device adapted to move an object, the actuator device comprising:
a housing containing a substantially fixed mass of air sufficient to operate the actuator device, the housing substantially sealed such that the substantially fixed mass of air is maintained therein;
a piston positioned in the housing and separating the housing into a first chamber and a second chamber, the piston movable along the longitudinal axis in response to a pressure differential in the housing between the first chamber and the second chamber;
a rod coupled to the piston for movement with the piston, the rod extending through the first chamber and at least partially extending outside of the housing to couple to the object; and
an air transfer device located in the second chamber of the housing and selectively operable to generate the pressure differential in the housing and transfer air from the second chamber to the first chamber, thereby moving the piston and the rod in a first direction,
wherein air is vented from the first chamber to the second chamber to move the piston and the rod in a second direction.

33. The actuator device of claim 32 wherein the pressure differential in the housing includes air pressure in the first chamber of the housing greater than air pressure in the second chamber of the housing.

34. The actuator device of claim 32, and further comprising a passageway fluidly connecting the air transfer device and the first chamber, wherein the passageway is located in the housing.

35. The actuator device of claim 34, and further comprising a valve positioned in the housing, the valve selectively fluidly connecting the first chamber via the passageway and the second chamber of the housing.

36. The actuator device of claim 35 wherein the valve selectively equalizes air pressure between the first chamber and the second chamber.

37. The actuator device of claim 35, and further comprising a switch selectively electrically connecting the valve and a power source.

38. The actuator device of claim 32, and further comprising a main power switch electrically connected with a power source and selectively electrically connected with the air transfer device to operate the air transfer device.

39. The actuator device of claim 38, and further comprising a normally-closed limit switch positioned within the housing adjacent the piston such that selective movement of the piston triggers the limit switch open or closed, the limit switch selectively electrically connecting the air transfer device and the main power switch.

40. The actuator device of claim 38, and further comprising a normally-closed limit switch positioned adjacent the rod such that selective movement of the rod triggers the limit switch open or closed, the limit switch selectively electrically connecting the air transfer device and the main power switch.

41. The actuator device of claim 38, and further comprising a pressure switch positioned within the housing, the pressure switch selectively electrically connecting the air transfer device and the main power switch based upon a pre-determined air pressure in the first chamber of the housing.

42. An actuator system comprising:
a main power switch electrically connected with a power source;
a self-contained actuator device including
a housing containing a substantially fixed mass of air sufficient to operate the actuator device, the housing substantially sealed such that the substantially fixed mass of air is maintained therein;
a movable piston positioned in the housing to separate the housing into a first chamber and a second chamber, the piston being movable along a longitudinal axis in response to a pressure differential in the housing between the first chamber and the second chamber;
a rod coupled to the piston for movement with the piston, the rod at least partially extending outside of the housing;
an air transfer device located within the housing and operable to generate the pressure differential in the housing and transfer air from the second chamber to the first chamber wherein a pre-determined air pressure is maintained in the first chamber, the air transfer device including an air inlet for receiving air from the second chamber and an air outlet for discharging air from the air transfer device, and wherein as air pressure accumulates within the first chamber the rod retracts into the housing;
a passageway fluidly connecting the air outlet of the air transfer device and the first chamber wherein the passageway is located in the housing;
a valve positioned in the housing, the valve selectively fluidly connecting the first chamber via the passageway and the second chamber, wherein the valve selectively equalizes air pressure between the first chamber and the second chamber by venting air pressure from the first chamber
wherein as air pressure vents from the first chamber the rod extends out of the housing;
an intermediate switch positioned within the housing, the intermediate switch selectively electrically connecting the air transfer device and the main power switch; and
an object coupled to a portion of the rod outside the housing, the object being moved in response to movement of the piston, and
wherein the main power switch is selectively electrically connected with the air transfer device to operate the air transfer device and selectively electrically connected with the valve to operate the valve.

43. The actuating system of claim 42 wherein the pressure differential in the housing includes an air pressure in the first chamber of the housing greater than air pressure in the second chamber of the housing.

44. The actuating system of claim 42 wherein the intermediate switch comprises a normally-closed limit switch positioned within the housing adjacent the piston such that selective movement of the piston triggers the limit switch open or closed.

45. The actuating system of claim 42 wherein the intermediate switch comprises a normally-closed limit switch positioned adjacent the rod such that selective movement of the rod triggers the limit switch open or closed.

46. The actuating system of claim 42 wherein the intermediate switch comprises a pressure switch positioned within the housing, the pressure switch selectively electrically connecting the air air transfer device and the main power switch based upon the pre-determined air pressure in the first chamber of the housing.

47. The actuating system of claim 42 wherein the object includes a lever for a clutch/brake assembly, wherein actuation of the lever causes engagement and disengagement of the clutch/brake assembly, and wherein the rod is coupled to the lever to engage and disengage the clutch/brake assembly in response to movement of the rod.

48. The actuating system of claim 47, and further comprising a spring coupled between the rod and the lever.

49. The actuating system of claim 42 wherein the object includes an idler pulley of a pulley system, wherein the idler pulley is selectively actuated to engage and disengage a belt in the pulley system, and wherein the rod is coupled to the idler pulley to engage and disengage the belt in response to movement of the rod.

50. The actuating system of claim 42 wherein the object includes a powered implement carried by a motorized vehicle.

51. The actuating system of claim 50 wherein the implement includes a mower deck carried by a riding lawnmower, and wherein the actuator device is configured to raise and lower the mower deck relative to a mowing surface traveled by the riding lawnmower.

* * * * *

UNITED STATES PATENT AND TRADEMARK OFFICE
CERTIFICATE OF CORRECTION

PATENT NO. : 7,007,447 B2
DATED : March 7, 2006
INVENTOR(S) : Robert W. Rush

It is certified that error appears in the above-identified patent and that said Letters Patent is hereby corrected as shown below:

<u>Title page, Item [54] and Column 1, lines 1-3,</u>
Title, "ACTUATOR DEVICE WITH A MULTI-CHAMBER HOUSING" should be -- ACTUATOR DEVICE --.

<u>Column 8,</u>
Line 54, "directions" should be -- direction --.

<u>Column 13,</u>
Line 15, "air air" should be -- air --.

Signed and Sealed this

Thirteenth Day of June, 2006

JON W. DUDAS
*Director of the United States Patent and Trademark Office*